United States Patent
DeLuca et al.

(10) Patent No.: US 11,308,949 B2
(45) Date of Patent: Apr. 19, 2022

(54) VOICE ASSISTANT RESPONSE SYSTEM BASED ON A TONE, KEYWORD, LANGUAGE OR ETIQUETTE BEHAVIORAL RULE

(71) Applicant: INTERNATIONAL BUSINESS MACHINES CORPORATION, Armonk, NY (US)

(72) Inventors: Lisa Seacat DeLuca, Baltimore, MD (US); Jeremy R. Fox, Georgetown, TX (US); Kelley Anders, East New Market, MD (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 16/299,748

(22) Filed: Mar. 12, 2019

(65) Prior Publication Data

US 2020/0294499 A1    Sep. 17, 2020

(51) Int. Cl.
| | |
|---|---|
| G10L 15/20 | (2006.01) |
| G10L 15/22 | (2006.01) |
| G06F 3/16 | (2006.01) |
| G06N 5/02 | (2006.01) |
| G06F 9/54 | (2006.01) |
| G10L 25/63 | (2013.01) |
| G10L 15/08 | (2006.01) |

(52) U.S. Cl.
CPC .............. *G10L 15/22* (2013.01); *G06F 9/547* (2013.01); *G06N 5/025* (2013.01); *G10L 15/08* (2013.01); *G10L 25/63* (2013.01); *G10L 2015/088* (2013.01); *G10L 2015/223* (2013.01)

(58) Field of Classification Search
CPC ........ G10L 15/20; G06F 3/167; H04R 1/1041
See application file for complete search history.

(56) References Cited

U.S. PATENT DOCUMENTS

| | | | |
|---|---|---|---|
| 2003/0101151 A1 | 5/2003 | Holland | |
| 2008/0199152 A1* | 8/2008 | Namba | H03G 1/00 386/338 |
| 2009/0018835 A1 | 1/2009 | Cooper | |
| 2018/0189630 A1 | 7/2018 | Boguraev | |
| 2018/0275951 A1* | 9/2018 | Kagoshima | G10L 15/20 |
| 2019/0155566 A1* | 5/2019 | Dory | G06F 3/167 |

(Continued)

OTHER PUBLICATIONS

Anonymous, "Advertise With MyKidsTime", mykidstime.com, 5 pages, https://www.mykidstime.com/advertise/.

(Continued)

*Primary Examiner* — Farzad Kazeminezhad
(74) *Attorney, Agent, or Firm* — Alexis N. Hatzis

(57) ABSTRACT

A method, computer system, and a computer program product for voice assistant responses is provided. The present invention may include configuring a behavioral rule. The present invention may include receiving a verbal request from a user and comparing the received verbal request to the behavioral rule. The present invention may then include determining that the received verbal request does not comply with the behavioral rule. The present invention may lastly include providing a response to the user based on determining that the received verbal request does not comply with the behavioral rule.

17 Claims, 6 Drawing Sheets

(56) References Cited

U.S. PATENT DOCUMENTS

2021/0216269 A1* 7/2021 Clark .................. H04R 1/1041

OTHER PUBLICATIONS

Braun-Silva, "Hey Google! Can You Teach My Kid Some Manners . . . Please?", nymetroparents.com, Feb. 1, 2018, 5 pages, https://www.nymetroparents.com/article/smart-home-tech-devices-and-kids-manners.

Darpa, "Teaching Robots "Manners": Digitally Capturing and Conveying Human Norms", darpa.mil, May 31, 2017, 3 pages, https://www.darpa.mil/news-events/2017-05-31.

Deselaers et al., Polite Mode for A Virtual Assistant, Defensive Publication Series, Technical Disclosure Commons, Feb. 21, 2018, 7 pages, https://www.tdcommons.org/dpubs_series/1060.

Gartenberg, "Should you say 'please' and 'thank you' to your Amazon Echo or Google Home?", theverge.com, Dec. 10, 2017, 2 pages, https://www.theverge.com/circuitbreaker/2017/12/10/16751232/smart-assistants-please-thank-you-politeness-manners-alexa-siri-google-cortana.

Gebhart, Google Assistant's Pretty Please Helps Your Kids Mind Their Manners, www.cnet.com, May 8, 2018 10:30 am PDT, Last printed Sep. 25, 2018, 2 pages, https://www.cnet.com/news/googles-pretty-please-feature-wants-to-help-you-enforce-manners/.

Mell et al., "The NIST Definition of Cloud Computing", National Institute of Standards and Technology, Special Publication 800-145, Sep. 2011, pp. 1-7.

Sullivan, "Amazon Echo, Alexa—You Need Better Manners", mediapost.com, Apr. 8, 2016, 2 pages, https://www.mediapost.com/publications/article/273082/amazon-echo-alexa-you-need-better-manners.html?edition=91914.

Unknown, "A Guide Tovoice Interfaces", voiceui.fjordnet.com, 5 pages, https://voiceui.fjordnet.com/.

Yang, et al., "Evaluation of Etiquette Strategies to Adapt Feedback In Affect-Aware Tutoring", SAGE journals, First published Sep. 8, 2016, 7 pages, https://doi.org/10.1177/1541931213601089.

* cited by examiner

VOICE ASSISTANT RESPONSE SYSTEM BASED ON A TONE, KEYWORD, LANGUAGE OR ETIQUETTE BEHAVIORAL RULE

BACKGROUND

The present invention relates generally to the field of computing, and more particularly to voice assistants.

Behavioral skills may be stressed by individuals who wish to instill in those around them a positively viewed behavior. For example, a parent or teacher may begin emphasizing the use of manners at a young age in order to instill in a child a sense of respect and to encourage the child to treat others with kindness.

SUMMARY

Embodiments of the present invention disclose a method, computer system, and a computer program product for voice assistant responses. The present invention may include configuring a behavioral rule. The present invention may include receiving a verbal request from a user and comparing the received verbal request to the behavioral rule. The present invention may then include determining that the received verbal request does not comply with the behavioral rule. The present invention may lastly include providing a response to the user based on determining that the received verbal request does not comply with the behavioral rule.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
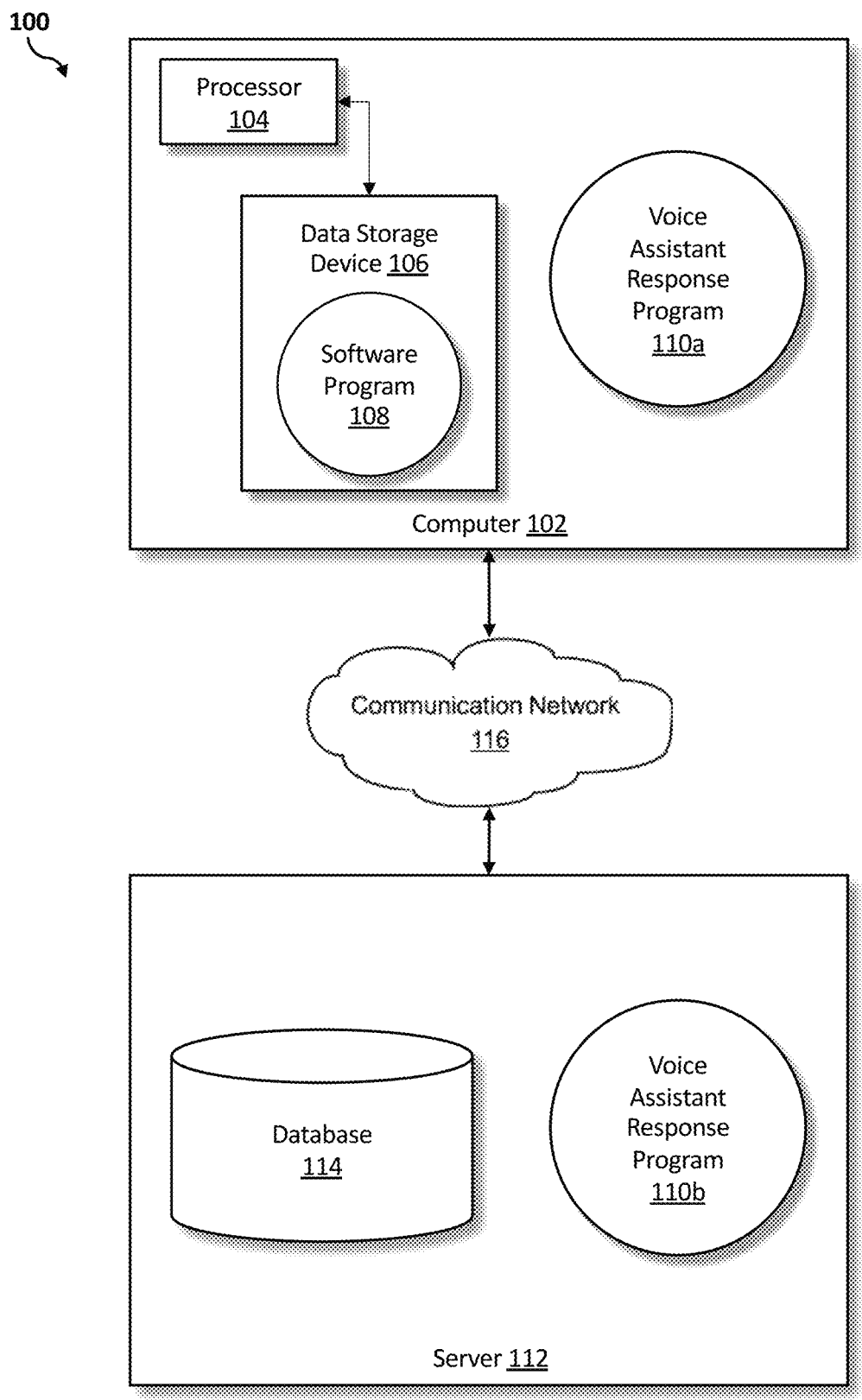
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for voice assistant responses. As such, the present embodiment has the capacity to improve the technical field of voice assistants by providing an interactive system which teaches a preferred behavioral skill based on a series of short interactions.

More specifically, the present invention may include configuring a behavioral rule. The present invention may include receiving a verbal request from a user and comparing the received verbal request to the behavioral rule. The present invention may then include determining that the received verbal request does not comply with the behavioral rule. The present invention may lastly include providing a response to the user based on determining that the received verbal request does not comply with the behavioral rule.

As described previously, behavioral skills may be stressed by individuals who wish to instill in those around them a positively viewed behavior. For example, a parent or teacher may begin emphasizing the use of manners at a young age in order to instill in a child a sense of respect and to encourage the child to treat others with kindness.

Individuals may be increasingly living with voice assistants, e.g., Siri®, Alexa®, in their homes and, as a result, may experience others' interactions with the voice assistants which utilize a style of speech that does not comport with the behavioral skills the individual may be taught. As a result, individuals may begin to put aside their own behavioral skills to interact with voice assistants in the same manner as those they may observe. For example, children may observe parents and/or siblings, among others, interact with a voice assistant in a manner which differs from the way the children were taught to interact. As a result, the children may modify their own behavior based on the behavior of those that they observe. The modified behavior may not utilize the same behavioral skills that the children are encouraged to use. As one example, adult individuals may use phrases like "please" and "thank you" when asking questions. These adult individuals may omit these polite phrases when requesting information from a voice assistant. A child may observe the omissions by the adult individual and articulate their questions and requests to both individuals and voice assistants in a similar manner.

Therefore, it may be advantageous to, among other things, provide a system and method to teach a preferred behavioral skill of a user through personal voice assistant interactions.

According to at least one embodiment, a voice assistant may be programmed to provide a response to a user command.

According to at least one embodiment, a voice assistant may ultimately teach a user one or more behavioral skills through interactions with the voice assistant, based on a preference of the user.

According to at least one embodiment, tone and sentiment analysis may be utilized, along with a corpus of previously observed behavioral skills, in order to ascertain a behavioral skill of the user which may be in need of improvement, or which the user would like to be educated on. Once a behavioral skill of the user, which is in need of improvement, is determined, the voice assistant may modify the voice assistant's own behavior in order to improve upon the user's behavioral skill.

According to at least one embodiment, a programmed voice assistant may be utilized to teach and/or reinforce a preferred behavioral skill, such as manners and/or etiquette.

A voice assistant may be used in combination with traditional teaching methods in a learning environment such as a classroom.

According to at least one embodiment, a programmed voice assistant may collect sensor data to determine a geographic location of the voice assistant, and based on the collected sensor data, the voice assistant may teach and/or reinforce a preferred behavioral skill that may be specific to the geographic location within which the voice assistant device is being used.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a voice assistant response program 110a. The networked computer environment 100 may also include a server 112 that is enabled to run a voice assistant response program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the voice assistant response program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the voice assistant response program 110a, 110b (respectively) to teach a preferred behavioral skill of a user through personal voice assistant interactions. The voice assistant response method is explained in more detail below with respect to FIGS. 2 and 3.

Figure 2:
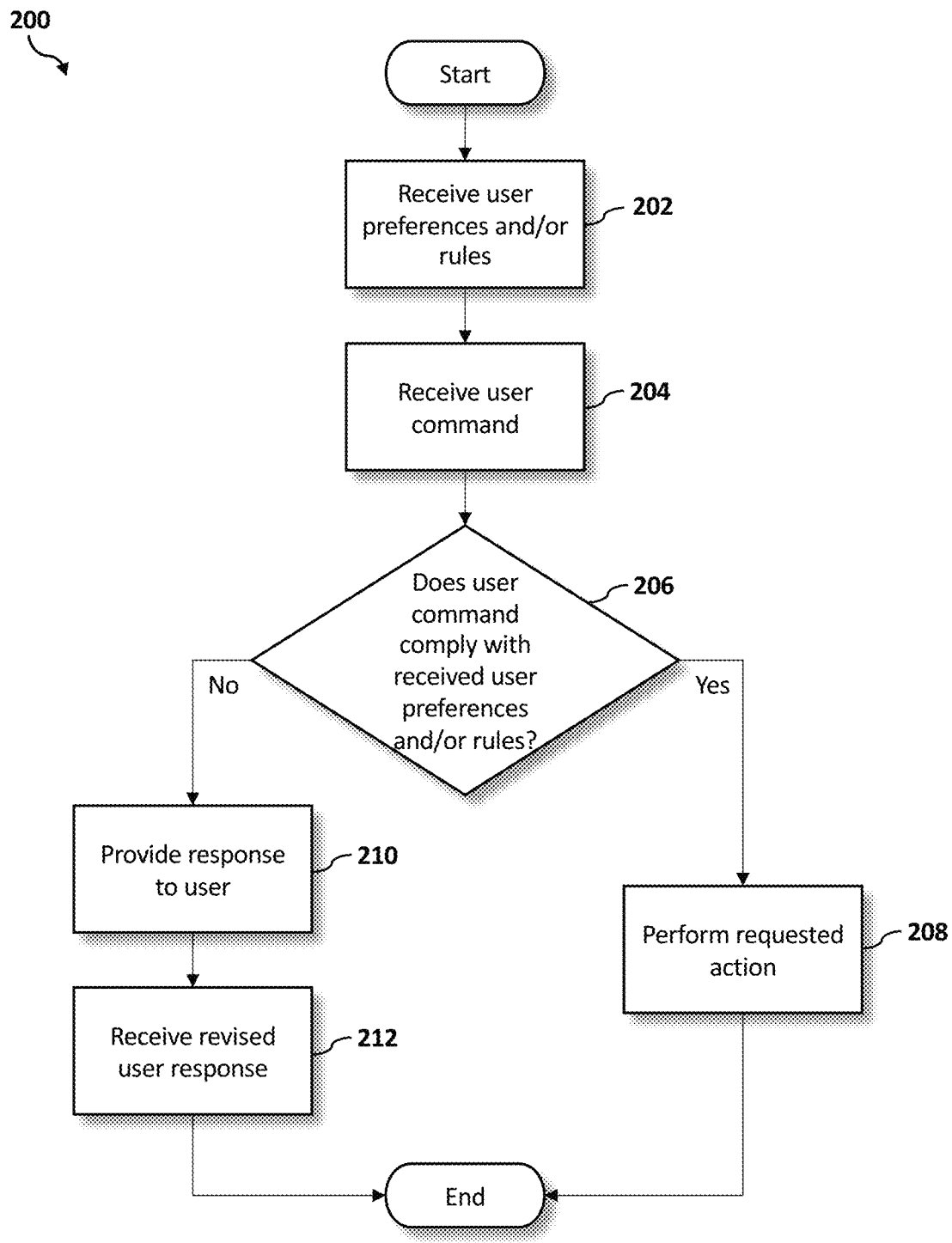
FIG. 2 is an operational flowchart illustrating a process for voice assistant responses according to at least one embodiment.

Referring now to FIG. 2, an operational flowchart illustrating the exemplary voice assistant response process 200 used by the voice assistant response program 110a and 110b according to at least one embodiment is depicted.

At 202, the voice assistant response program 110a, 110b receives user preferences and/or rules. User preferences and/or rules may be the basis for a behavioral skill which may be taught by the implementation of such preferences and/or rules. A user preference or set of preferences may include, among other things, when to invoke a proposed rule. An owner of a voice assistant device (e.g., a digital voice assistant, a virtual assistant, or an intelligent personal assistant which may be a software agent used to perform tasks or services for an individual based on commands issued by the individual) may set (i.e., define) preferences within an interface for the voice assistant response program 110a, 110b which may be accessible through a mobile or web application. An owner of a voice assistant device may also set (i.e., define) preferences verbally using commands recognized by the voice assistant response program 110a, 110b. In one embodiment, a voice assistant device may be a standalone device (e.g., a smart speaker such as Amazon Echo®). In other embodiments, a voice assistant device may be integrated into a mobile device (e.g., a smart phone and/or any other suitable device or system, including a vehicle, an appliance, and/or a kiosk).

A rule (e.g., a behavioral, tone, volume, keyword, etiquette, or language rule) may be defined by an owner of the voice assistant device within an interface for the voice assistant response program 110a, 110b and may be turned on (e.g., activated, enabled) verbally using commands recognized by the voice assistant response program 110a, 110b.

A rule (e.g., a behavioral, tone, volume, keyword, etiquette, or language rule) may also be defined by an owner of the voice assistant device on the voice assistant device itself, through a compatible mobile application, (e.g., a custom application developed for the voice assistant response program 110a, 110b), or through a third-party service. For example, if a particular rule is not embedded in the default settings for the voice assistant response program 110a, 110b, then a third-party developer may create his or her own rule and/or skill to be implemented by the voice assistant response program 110a, 110b. A third-party rule and/or skill may be created, and preferences may be set, through a website, through application programming interface (API) calls, or through a third-party application, among other things.

A rule (e.g., a behavioral, tone, volume, keyword, etiquette, or language rule) may be a set of standards that a user of the voice assistant may be required to abide by. Rules configured by a user of the voice assistant may include, but are not limited to including, a tone rule (e.g., requiring a user of the voice assistant to use an acceptable tone of voice before the voice assistant may perform a requested action), a keyword rule (e.g., requiring a user of the voice assistant to use one or more defined keywords before the voice assistant may perform a requested action), a manner encouraging rule (e.g., requiring a user of the voice assistant to speak with manners before the voice assistant may perform a requested action), a volume rule (e.g., requiring a user of the voice assistant to use a speaking voice, and not issue the command by screaming and/or yelling), and an etiquette rule (e.g., requiring a user of the voice assistant to use respect, kindness, and consideration in all interactions while talking, acting, living, and moving, before the voice assistant may perform a requested action).

Rules configured by a user of the voice assistant may also include those pertaining to a preferred language (i.e., a language rule), in order to encourage a user of the voice assistant to speak in accordance with this rule (e.g., to verbalize commands in the preferred language). A language rule may enable a user of the voice assistant to learn and/or develop skills relating to a second language.

For example, an owner of a voice assistant device may configure a manner encouraging rule and may set preferences on when to invoke the manner encouraging rule. The manner encouraging rule may be defined by the owner of the voice assistant device within an application interface for the voice assistant response program 110*a*, 110*b* and may be turned on verbally using commands recognized by the voice assistant response program 110*a*, 110*b*. The manner encouraging rule may have differing specifications for each user of the voice assistant device. The differing specifications may include changes in the type of manners being encouraged and/or a loosening of the manner encouraging rules depending on which user is communicating with the voice assistant.

Enforcement of a rule defined by an owner of a voice assistant device may also be based on detected nearby users of the voice assistant device. In various embodiments, the voice assistant device may employ algorithms for recognizing and distinguishing between speech by adults and children (e.g., a speech classifier based on spectral characteristics of speech). For example, enforcement of the manner encouraging rules may be based on nearby users of the voice assistant device. If the voice assistant device recognizes a child's voice issuing a verbal command, and then minutes later or earlier recognizes an adult's voice issue a verbal command, then the voice assistant response program 110*a*, 110*b* may enforce the manner encouraging rules to ensure that adults (e.g., parents of young children) encourage positive behavioral skills by showing manners when children are present. Similarly, if the voice assistant device does not recognize a child's voice in a configurable time period preceding receiving a voice command, then the voice assistant response program, 110*a*, 110*b* may not enforce the manner encouraging rules based on an inference that a child is not present in an area proximate to the voice assistant device. As described below, an inference that a child is not present may also be based on a time of day or day of week.

A nearby user of the voice assistant device may be detected through Bluetooth® (Bluetooth and all Bluetooth-based trademarks and logos are trademarks or registered trademarks of Bluetooth SIG, Inc. and/or its affiliates) sensors and/or beacons, a volume of a user's voice (e.g., a loud voice may indicate the user is nearby while a soft voice may indicate the use is farther away), and voice identification techniques, among other things.

Enforcement of a rule defined by an owner of a voice assistant device may also be based on the time of day that the voice assistant device is being used. To enable this functionality, a user of the voice assistant device may specify (e.g., within the interface for the voice assistant response program 110*a*, 110*b* or by issuing a verbal command) a time period within which the rule will be active (e.g., a time of day parameter). For example, a user of a voice assistant device may specify that the manner encouraging rule not be active during the children's school hours of 7 a.m. to 3 p.m. During this time an adult user of the voice assistant device may not be required to issue commands which comply with the manner encouraging rule.

However, the voice assistant response program 110*a*, 110*b* may be programmed with an override capability which may activate if a child's voice is heard during specified school hours. In this case, a rule which may otherwise not be enforced during school hours, may be enforced, overriding a time of day parameter.

Enforcement of a rule defined by an owner of a voice assistant device may also be based on the geographic area (e.g., a given country, state, and/or home) within which the voice assistant device is being used. For example, a user of a voice assistant device may specify that a given set of manner encouraging rules should not be invoked when the voice assistant device is located in a specified geographic region, so as to enable societal norms of a local culture to be encouraged.

At 204, the voice assistant response program 110*a*, 110*b* receives user commands. Once a voice assistant device is turned on, a user of the voice assistant device may interact with the voice assistant device by issuing verbal commands. The voice assistant device may learn a user's voice based on continuous commands issued by the user. A user profile may be configured within the voice assistant response program 110*a*, 110*b* which may include user specifications and which may be trained to learn the user's voice based on a series of phrases issued to the voice assistant response program 110*a*, 110*b*. A user profile may also include the user's age and any applicable user rules.

A voice assistant may recognize different users based on voice (e.g., using voice identification techniques), grammar, and tone of voice, among other things.

The voice assistant response program 110*a*, 110*b* may alternatively, or additionally, implement generic rules which may apply to all users of the voice assistant.

If, at 206, the voice assistant response program 110*a*, 110*b* determines that the received user command complies with the received user preferences and/or rules, then at 208, the voice assistant performs the requested action. The voice assistant response program 110*a*, 110*b* may compare the received user command to a predefined rule to determine whether the received user command complies with the predefined rule.

A comparison of the received user command to the predefined rule may include analyzing the tone of a received user command using an intelligent machine learning engine, including a Watson™ (Watson and all Watson-based trademarks are trademarks or registered trademarks of International Business Machines Corporation in the United States, and/or other countries) application programming interface (API) (e.g., Watson™ Tone Analyzer API), among other APIs. A tone analyzer API may detect whether the user command depicts a tone which is intense, lighthearted, serious, whimsical, friendly, witty, or aggressive, among other tones of voice and/or styles of speech. In an embodiment, analyzing the tone of a received user command may include techniques that analyze the auditory coloring of speech to determine emotion or attitude, such as classifying phonation types, pitch, and loudness ranges. In another embodiment, analyzing the tone of a received user command may include techniques that use linguistic analysis to detect emotion in text. The predefined rule, described above, may govern how to proceed based on each detected style of speech.

The voice assistant response program 110*a*, 110*b* may also detect, using the previously described APIs, whether keywords (i.e., trigger words) were included within the user command. Keywords may be defined within a predefined rule of the voice assistant response program 110*a*, 110*b*. For example, keywords of "please" and "thank you" may be defined within a manner encouraging rule.

A semantic analysis and/or sentence structure analysis may also be used to determine the presence or absence of any specified keywords, or whether a sentence or phrase conforms to a grammatical rule. For example, the voice assistant response program 110a, 110b may detect, based on a semantic analysis and/or sentence structure analysis, whether the words "please" or "thank you" were part of a user's verbal command.

If no keywords are defined within the voice assistant response program 110a, 110b, then the voice assistant response program 110a, 110b may reference a connected observed behavior corpus (e.g., database 114) which may store time, location, image content, and activity information based on connected information of things (IoT) sensors. Sensor data contained within the observed behavior corpus (e.g., database 114), as well as interaction history between the user and the voice assistant, may be used to determine when a behavioral rule may be desired (e.g., when a behavioral standard may be intended, even though the behavioral standard may not be explicitly defined). In this case, the voice assistant response program 110a, 110b may create a desirable behavioral rule based on the sensor data and interaction history.

Rules relating to a behavioral rule (i.e., a behavioral skill) generated by the voice assistant response program 110a, 110b may be confirmed by a user of the voice assistant prior to being enforced by the voice assistant response program 110a, 110b. Confirmation of rules generated by the voice assistant response program 110a, 110b may be done within an interface for the voice assistant response program 110a, 110b or by issuing a verbal command.

Continuing with the above example, if a user command of "Alexa, please turn on the lights!" passes the predefined manner encouraging rules, then the voice assistant performs the user's requested action.

If, at 206, the voice assistant response program 110a, 110b determines that the received user command complies with the received user preferences and/or rules, then at 210, the voice assistant response program 110a, 110b provides a response to the user. A response may include, but is not limited to including, a visual and/or audible response. A visual response may include an indicator light on the voice assistant which may change color to indicate that the user command does not comply with the predefined preferences and/or rules, and that the voice assistant may not perform the requested action. An audible response may include a prompt to the user to issue the command again using different language (e.g., language that complies with the behavioral skill), a teaching statement to reinforce the desired behavioral skill, and/or a question to inquire as to whether the user would like to hear how a command in compliance with the behavioral skill may be made, among other audible responses. A response may also take the form of a gamified response, whereby the voice assistant may keep track of the number of times commands may be issued in accordance with the desired behavioral skill. In various embodiments, game principles may be incorporated to encourage learning. For example, the count of correct commands may be compared with a game rule that provides a reward or recognition when the count exceeds a particular number. One example of a gamified response is "Thank you, for asking so nicely! You've reached the master of manners first level."

Continuing with the above example, if the user issues a command that is not in compliance with the manner encouraging rules, then the voice assistant response program 110a, 110b may provide an audible response or prompt to rephrase or revise a request such as the following:

"I am happy to answer that question for you if you ask again nicely."

"I didn't hear the magic word."

"You didn't say please but I will stop playing the music."

"Would you like me to call up an example of how <person> would make this request?"

The previously described examples of audible responses may be implemented using the following code:

```
app.launch((request, response, tone) => {tone!=$nice;
response.say('I didn't hear the magic word.');
response.shouldEndSession(false);});
```

Lastly, at 212, a revised user response is received. The user may revise the request and/or issue the command again using language that complies with an implemented preference and/or rule. Alternatively, an owner of the voice assistant may choose to override the request for a revised response by issuing a verbal instruction to that effect (e.g., "Watson, ignore manners for the next 10 minutes."). If such an instruction is received, the voice assistant response program 110a, 110b may recognize the owner's voice based on the voice training described previously at step 202 above and may comply with the command overriding the request for a revised response.

Figure 3:
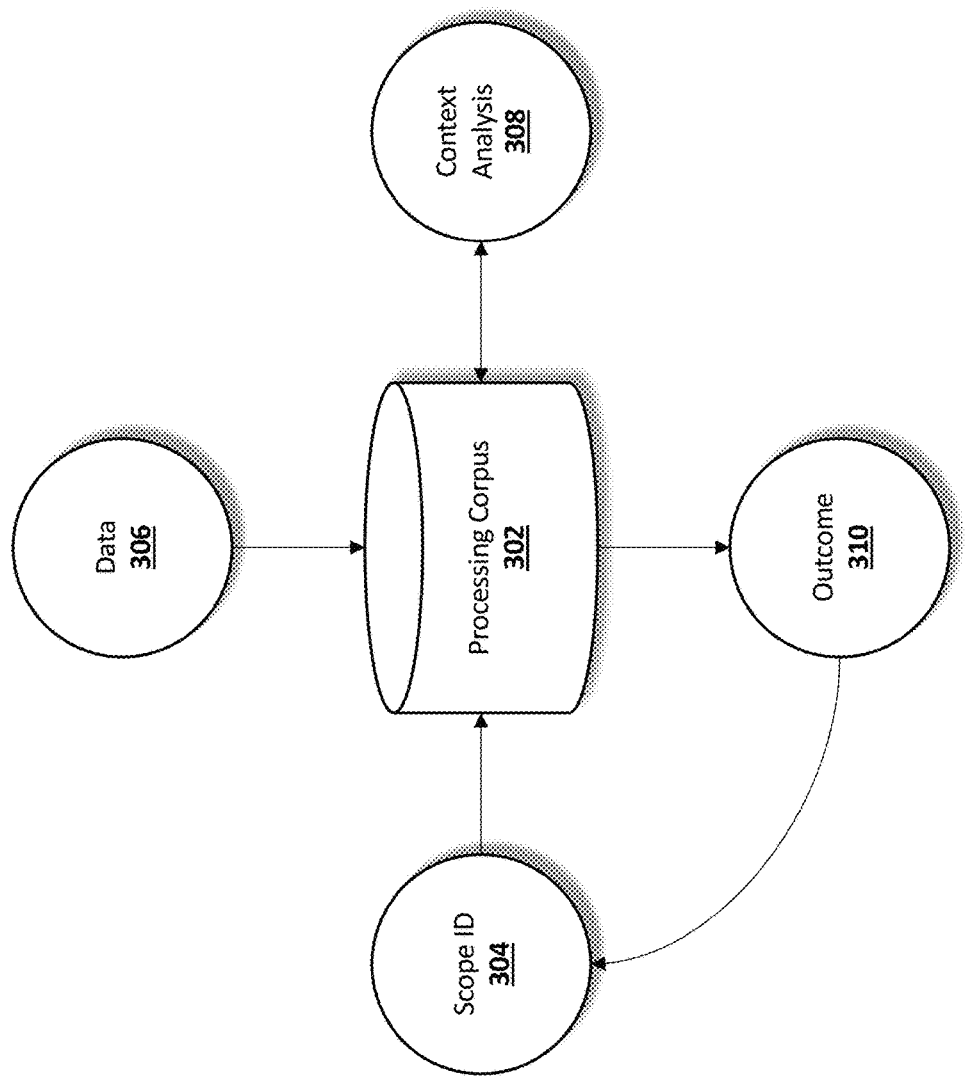
FIG. 3 is a block diagram of the voice assistant response program according to at least one embodiment.

Referring now to FIG. 3, a block diagram of the voice assistant response program 300 according to at least one embodiment is depicted. A processing corpus 302 processes the received commands and determines whether to perform a requested action. A scope identification module 304 identifies any keywords within a user's command and feeds the identified keywords back into the processing corpus 302. Data module 306 refers to the collection of reference data (e.g., context information) surrounding the identified keyword(s) which may be acquired by the voice assistant response program 110, 110b. The context analysis module 308 refers to the analysis of context information gathered by the data module 306 which may be fed into the processing corpus 302. The context analysis module 308 may also utilize pattern recognition and natural language processing techniques, among other processing methods, to better understand the user's command. The outcome module 310 may refer to the outcome of the user's command, including but not limited to the performance of a requested action and/or a response fed back to the user.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
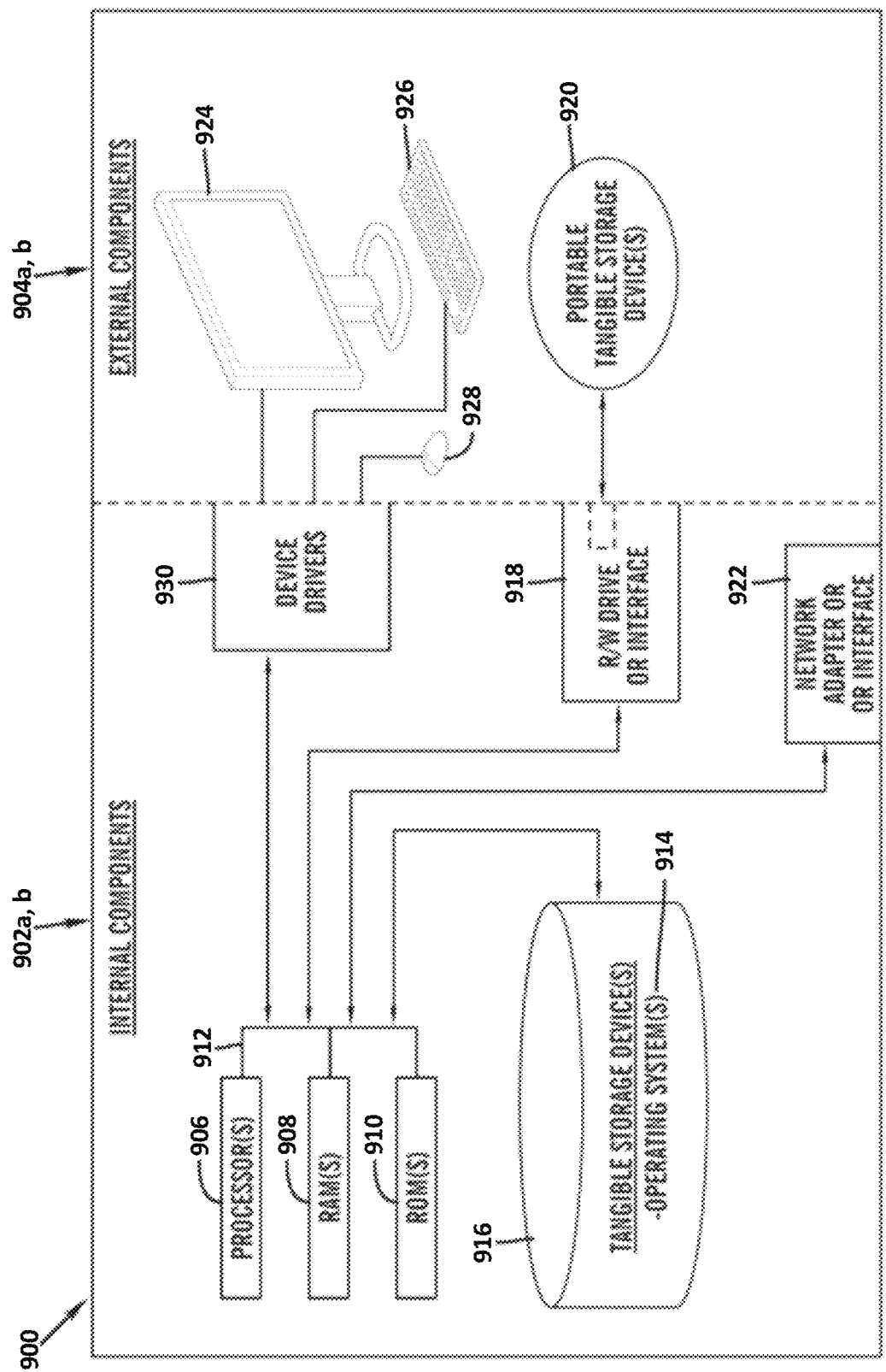
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the voice assistant response program 110a in client computer 102, and the voice assistant response program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the voice assistant response program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the voice assistant response program 110a in client computer 102 and the voice assistant response program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the voice assistant response program 110a in client computer 102 and the voice assistant response program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
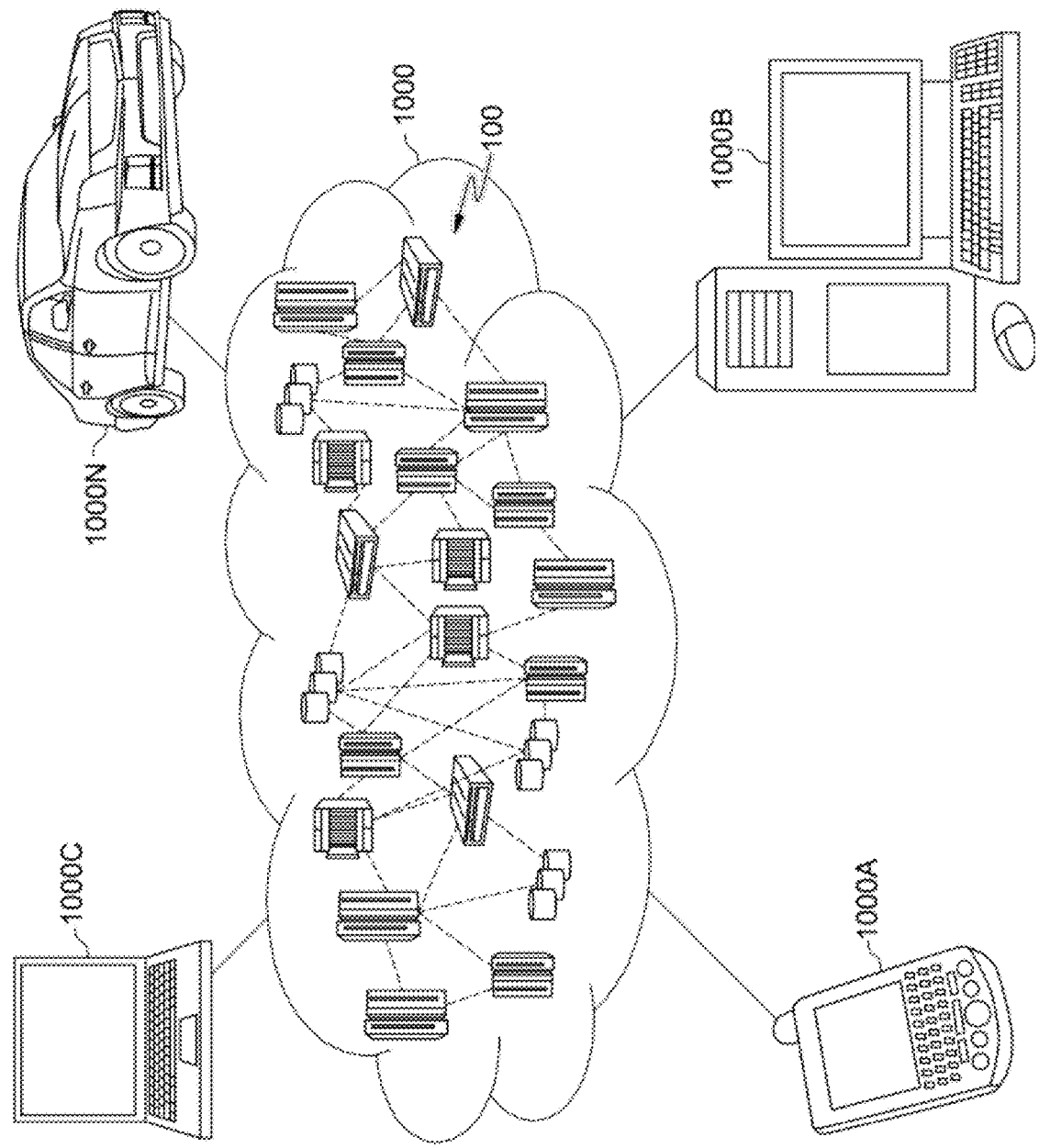
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
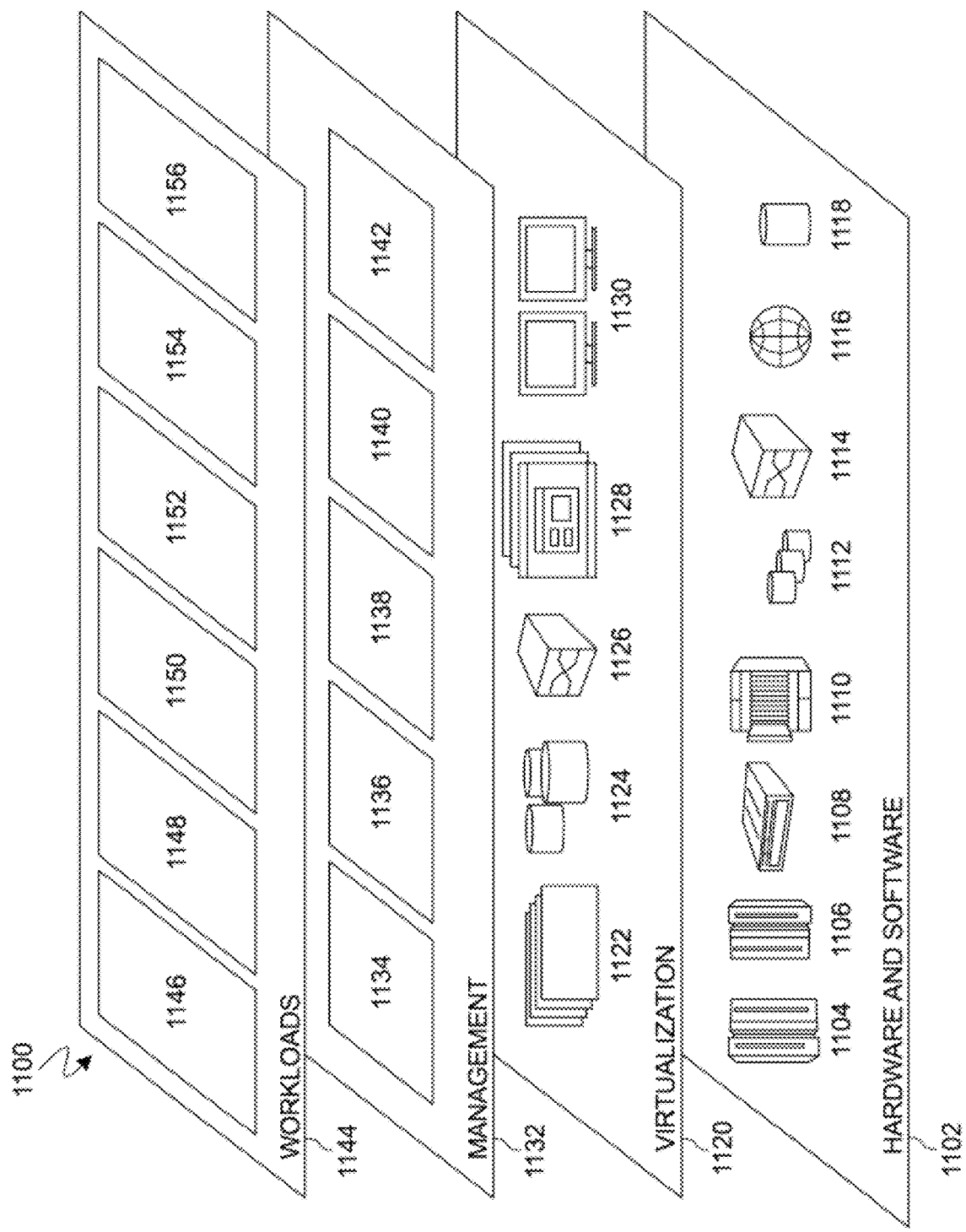
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and voice assistant responses 1156. A voice assistant response program 110a, 110b provides a way to teach a preferred behavioral skill of a user through personal voice assistant interactions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for voice assistant responses, the method comprising:

configuring a behavioral rule;

receiving a verbal request from a user and comparing the received verbal request to the behavioral rule;

detecting a presence of a nearby user, based on a volume of speech of the nearby user, using a speech classifier based on spectral characteristics of speech, and enforcing the behavioral rule based on the detected presence and a time of day that the voice assistant is being used;

determining that the received verbal request does not comply with the behavioral rule;

and providing a response to the user based on determining that the received verbal request does not comply with the behavioral rule;

wherein the behavioral rule is selected from a group consisting of a tone rule, a keyword rule, a language rule, and an etiquette rule.

2. The method of claim 1, wherein the response provided to the user is one of a visual response and an audible response, and is selected from a group consisting of a question, a prompt for a revised request from the user, and a gamified response.

3. The method of claim 1, wherein an override capability activates to override the behavioral rule when an activating person's voice is heard during a specified hour.

4. The method of claim 1, wherein configuring the behavioral rule further comprises:
   receiving a set of preferences within a mobile or web application interface, based on a verbal command or question.

5. The method of claim 1, wherein determining that the received verbal request does not comply with the behavioral rule further comprises:
   analyzing the received verbal request using one or more connected application programming interfaces (APIs); and
   detecting a keyword defined within the behavioral rule.

6. The method of claim 1, further comprising:
   accessing an observed behavior corpus; and
   creating a new behavioral rule based on sensor data and interaction history within the observed behavior corpus.

7. A computer system for voice assistant responses, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   configuring a behavioral rule;
   receiving a verbal request from a user and comparing the received verbal request to the behavioral rule;
   detecting a presence of a nearby user, based on a volume of speech of the nearby user, using a speech classifier based on spectral characteristics of speech, and enforcing the behavioral rule based on the detected presence and a time of day that the voice assistant is being used;
   determining that the received verbal request does not comply with the behavioral rule;
   and providing a response to the user based on determining that the received verbal request does not comply with the behavioral rule;
   wherein the behavioral rule is selected from a group consisting of a tone rule, a keyword rule, a language rule, and an etiquette rule.

8. The computer system of claim 7, wherein the response provided to the user is one of a visual response and an audible response.

9. The computer system of claim 7, wherein the response provided to the user is selected from a group consisting of a question, a prompt for a revised request from the user, and a gamified response.

10. The computer system of claim 7, wherein configuring the behavioral rule further comprises:
    receiving a set of preferences within a mobile or web application interface, based on a verbal command or question.

11. The computer system of claim 7, wherein determining that the received verbal request does not comply with the behavioral rule further comprises:
    analyzing the received verbal request using one or more connected application programming interfaces (APIs); and
    detecting a keyword defined within the behavioral rule.

12. The computer system of claim 7, further comprising:
    accessing an observed behavior corpus; and
    creating a new behavioral rule based on sensor data and interaction history within the observed behavior corpus.

13. A computer program product for voice assistant responses, comprising:
    one or more computer-readable storage media and program instructions stored on at least one of the one or more tangible storage media, the program instructions executable by a processor to cause the processor to perform a method comprising:
    configuring a behavioral rule;
    receiving a verbal request from a user and comparing the received verbal request to the behavioral rule;
    detecting a presence of a nearby user, based on a volume of speech of the nearby user, using a speech classifier based on spectral characteristics of speech, and enforcing the behavioral rule based on the detected presence and a time of day that the voice assistant is being used;
    determining that the received verbal request does not comply with the behavioral rule;
    and
    providing a response to the user based on determining that the received verbal request does not comply with the behavioral rule;
    wherein the behavioral rule is selected from a group consisting of a tone rule, a keyword rule, a language rule, and an etiquette rule.

14. The computer program product of claim 13, wherein the response provided to the user is one of a visual response and an audible response.

15. The computer program product of claim 13, wherein the response provided to the user is selected from a group consisting of a question, a prompt for a revised request from the user, and a gamified response.

16. The computer program product of claim 13, wherein determining that the received verbal request does not comply with the behavioral rule further comprises:
    analyzing the received verbal request using one or more connected application programming interfaces (APIs); and
    detecting a keyword defined within the behavioral rule.

17. The computer program product of claim 13, further comprising:
    accessing an observed behavior corpus; and
    creating a new behavioral rule based on sensor data and interaction history within the observed behavior corpus.

* * * * *